(12) United States Patent
Zhang et al.

(10) Patent No.: US 12,536,866 B2
(45) Date of Patent: Jan. 27, 2026

(54) CASINO DECENTRALIZED MANAGEMENT TO COLLECT AND SHARE PLAYER CREDIT DATA

(71) Applicant: IGT, Las Vegas, NV (US)

(72) Inventors: Haiyun Zhang, Beijing (CN); Yizhao Zhu, Macau (CN); Jun Robert Li, Beijing (CN); Xiang Wu, Beijing (CN)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 18/468,953

(22) Filed: Sep. 18, 2023

(65) Prior Publication Data

US 2024/0013618 A1 Jan. 11, 2024

Related U.S. Application Data

(62) Division of application No. 17/214,261, filed on Mar. 26, 2021, now Pat. No. 11,798,358.

(51) Int. Cl.
G07F 17/32 (2006.01)

(52) U.S. Cl.
CPC ...... *G07F 17/3239* (2013.01); *G07F 17/3244* (2013.01)

(58) Field of Classification Search
CPC .................... G07F 17/3239; G07F 17/3244
See application file for complete search history.

(56) References Cited

U.S. PATENT DOCUMENTS

| 9,396,349 | B1* | 7/2016 | Berfeld | G06F 21/6209 |
| 11,393,024 | B1 | 7/2022 | Kodihalli | |
| 2018/0253464 | A1* | 9/2018 | Kohli | G06F 16/219 |
| 2019/0190698 | A1 | 6/2019 | Nuzzi | |
| 2019/0259025 | A1* | 8/2019 | Hilton | G06Q 20/405 |
| 2020/0143466 | A1 | 5/2020 | Wu | |
| 2020/0294037 | A1 | 9/2020 | Srivastava | |
| 2020/0357233 | A1 | 11/2020 | Ma | |
| 2020/0410820 | A1 | 12/2020 | Ellis | |

(Continued)

OTHER PUBLICATIONS

Why (TF) Blockchain? Exploring the Nature and Purpose of Single Source of Truth Systems https://blog.coinfund.io/why-tf-blockchain-exploring-the-nature-and-purpose-of-single-source-of-truth-systems-b68c4b257352 Aleksandr Bulkin Jun. 14, 2019 (Year: 2019).*

(Continued)

*Primary Examiner* — Jeffrey K Wong
(74) *Attorney, Agent, or Firm* — Sage Patent Group

(57) ABSTRACT

Systems and methods are provided. A system includes a communication interface, a processor circuit and a memory coupled to the processor circuit. The memory includes machine readable instructions that, when executed by the processor circuit, cause the processor circuit to receive, from a casino operator, a request for credit data that corresponds to a player that requested credit from the casino operator, to use in a wagering event. The processor circuit is further caused to, in response to receiving the request for credit data, receive, from a decentralized distributed casino credit management architecture, a data block that includes a credit record that corresponds the player. The processor circuit is further caused to determine, based on the credit record, a response to the player that requested the credit. The response includes extending the requested credit to the player or denying the requested credit.

13 Claims, 11 Drawing Sheets

(56) References Cited

U.S. PATENT DOCUMENTS

2021/0295303 A1    9/2021  Phan
2022/0171830 A1*  6/2022  Gokan ................... G06F 21/64

OTHER PUBLICATIONS

Blockchain for Business: Applications of Blockchain Systems https://mba.csumb.edu/blog/blockchain-for-business Oct. 7, 2019 (Year: 2019).*

* cited by examiner

CASINO DECENTRALIZED MANAGEMENT TO COLLECT AND SHARE PLAYER CREDIT DATA

CROSS REFERENCE TO RELATED APPLICATIONS

The present application is a continuation of U.S. patent application Ser. No. 17/214,261, filed Mar. 26, 2021, entitled, "CASINO DECENTRALIZED MANAGEMENT TO COLLECT AND SHARE PLAYER CREDIT DATA," the disclosure and content of which is incorporated herein in its entirety.

BACKGROUND OF THE DISCLOSURE

Casinos have existing business models that may grant selected players a certain amount of credit so that the player can borrow money or other credits from the casino to play and pay back the money later. In the casino industry, this model may provide a better casino experience for those selected players and thus may bring more players to casinos eventually. However, there is of bad debt with the current model. Many of those selected players would be granted with amount of credit in multiple different casinos. Each casino is unaware of any significant debts that the player has in other casinos. A conventional way to track player credit in different casinos may include a centralized system which collects player's credit data from all the casinos and provides query services to all those casinos. However, such a centralized system may be prohibitively expensive to build and maintain and may raise significant questions about data security and/or privacy constraints.

BRIEF SUMMARY OF THE DISCLOSURE

Some embodiments are directed to a system includes a communication interface, a processor circuit and a memory coupled to the embodiments. The memory includes machine readable instructions that, when executed by the processor circuit, cause the processor circuit to receive, from a casino operator, a request for credit data that corresponds to a player that requested credit from the casino operator. The requested credit may be designated for use in a wagering event in the casino. In response to receiving the request for credit data, the processor circuit further receives, from a decentralized distributed casino credit management architecture, a data block that includes a credit record that corresponds the player. The processor circuit may be further configured to determine, based on the credit record, a response to the player that requested the credit. The response may include extending the requested credit to the player or denying the requested credit.

Some embodiments are directed to methods that include operations. Such operations may include receiving, from a non-participating party, a request to join a customer credit consortium blockchain that includes multiple member parties and detecting compliance of the non-participating party relative to a multi-party agreement that is associated with the customer credit consortium blockchain. Operations may include, in response to detecting that the non-participating party is not compliant with the multi-party agreement, causing a refusal message to be sent to the non-participating party indicating that the non-participating party is not permitted to join the customer credit consortium blockchain. In response to detecting that the non-participating party is compliant with the multi-party agreement, causing an invitation to the customer credit consortium blockchain to be sent to the non-participating party. Operations include changing a status of the non-participating party to a customer credit consortium blockchain party and causing an instance of the customer credit consortium blockchain to be sent to the customer credit consortium blockchain party.

Some embodiments are directed to systems and methods that are configured to perform operations. Such operations include receiving a request for credit data. Operations include receiving, by a party of multiple parties, a request for credit data that corresponds to a customer that requested credit from the party. In response to receiving the request for credit data, operations further receive, from a decentralized distributed credit management architecture, a data block that comprises a credit record that corresponds the customer. Operations include determining, based on the credit record, a response to the customer that requested the credit and update the decentralized distributed credit management architecture with an outcome of determining the response to the customer.

DETAILED DESCRIPTION OF THE DISCLOSURE

Figure 1:
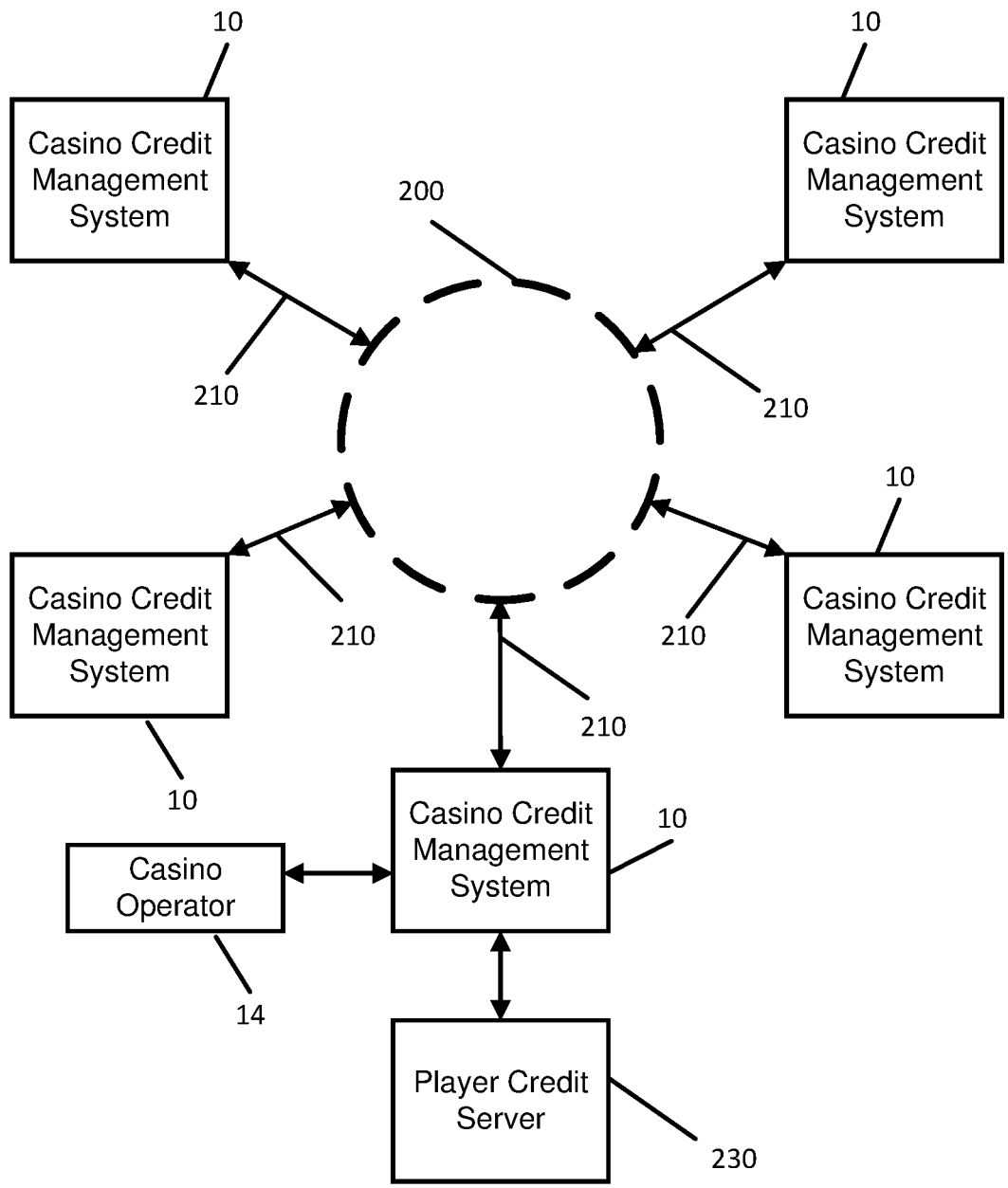
FIG. 1 is a schematic block diagram illustrating a system architecture according to some embodiments herein.

Embodiments herein may use blockchain methods to establish a decentralized management system that is configured to share the player's real time debt/credit status among casinos. Casino operators can access credit reports of players including updates on player loan activities through a private, secure and non-erasable way. Embodiments herein may begin with having all participating casinos reach an agreement to create a consortium blockchain system to manage player's credit. Participating casinos will upload their player's credit data to the blockchain. In some embodiments, player credit data may include a player's total debts and/or overdue records.

In response to a player applying to borrow money from the casino, the casino operator will check that player's credit data that may include a total debt amount in all casinos using the blockchain to evaluate the risk of extending any further credit to that player. If casino operator decides to extend the credit to the player, then the casino operator will send that information to the blockchain to update the blockchain data block that is associated with the player. In some embodiments, the casino may update the blockchain to provide information that the credit was not extended to the player. Such information may also be stored in the data block corresponding to the player. Some embodiments provide that updating the player's new credit request, debt and/or credit denial to the data block may cause the data block to be synchronized with other casinos.

Some embodiments provide that casinos have agreed to create a consortium blockchain system to manage player credit, which includes player debts and/or overdue records, among others. Some embodiments provide that when another casino wants to join as a node in the system, all of the existing consortium members will renegotiate the agreement. In some embodiments, when there is a piece of shared data corresponding to a player's credit, the casino generates a block and uploads it to the consortium blockchain.

In use and operation, when a player wants to borrow money from a casino, the member applies for the credit with the casino operator 14, who then enters data corresponding to the player and/or the credit request. The casino credit management system 10 may request player's overall credit data from the blockchain 200. The blockchain 200 sends the player's credit data to casino credit management system 10 and/or the player credit server 230. The casino credit management system 10 and/or the player credit server 230 may check player's overall credit data based on the data block in the blockchain 200. In some embodiments, the casino credit management system 10 and/or the player credit server 230 may be able to determine whether or not the credit is to be extended. Some embodiments provide that the credit data may be transmitted to the casino operator 14 to determine whether or not credit is to be extended to the player. Some embodiments provide that the data in the data block and/or portions thereof, may be sent to the blockchain 200 for updating the data block corresponding to the player. For example, whether or not the request for the credit is granted may be added to the data block to provide updated credit data.

Reference is now made to FIG. 1, which is a schematic block diagram illustrating a system architecture according to some embodiments herein. Each of the multiple different casinos may include a casino credit management system 10 that may have access to a decentralized data source that is provided as a blockchain 200. The blockchain 200 may include multiple different data blocks that each correspond to a different player that has received and/or requested credit from one of the consortium casinos. In some embodiments, each casino credit management system 10 may store or cause to be stored an instance of the blockchain 200, which may include a communication channel 210 to the blockchain 200. In this manner, each casino credit management system 10 may be communicatively coupled, directly and/or indirectly, to every other casino credit management system 10 in the consortium. Although not illustrated in this figure, some embodiments provide that intervening networks may be included in the communication channel 210. Updated and/or new player credit data may be uploaded via the communication channel 210 to the blockchain 200 based on consensus that the update and/or new player credit data meets a consensus requirement.

Data corresponding to the blockchain 200 may be used by receiving player data through a server, such as, a player credit server 230. The player credit server 230 may receive player credit requests and/or data and analyze the player credit data to determine if the player should be extended credit based on the data block that is in the blockchain 200 and that corresponds to that player. Although illustrated as a separate server, the player credit server 230 may be within the casino management system 10.

In some embodiments, the casino operator 14 determines that the debt corresponding to the previously extended credit has been returned by the player. In such case, the casino operator 14 may cause the player's credit data to be updated in the data block in the blockchain 200. In some embodiments, the casino operator 14 determines that the player has not repaid the debt corresponding to the previously extended credit. In such case, the casino operator 14 may cause the player's credit data to be updated in the data block in the blockchain. In this manner, the data corresponding to the credit risk of extending credit to that player may be shared with all of the casino credit management systems 10 in the player credit consortium.

Some embodiments provide that a casino may request to join the player credit consortium. Responsive to receiving a request to join, the requesting casino may first execute a casino agreement. Once the casino agreement is executed by the requesting casino, then the player credit consortium may determine if the requesting casino satisfies the requirements of a multi-party agreement that governs the conduct of the player credit consortium members. Once the new casino is added to the player credit consortium, an updated player credit consortium is generated and the multi-party agreement is negotiated.

Embodiments herein may provide improved the stability and security of the player credit management system and can be implanted within and/or across jurisdictions. In the context of casinos, embodiments may provide improved convenience and value to manage player's credit. Some embodiments provide that the blockchain makes sharing information more timely and secure. Further, embodiments may help casinos reduce loss and avoid risks corresponding to player credit. In this manner, the casinos may provide better services to valuable players and improve the quality and reputation of casino's service. Further, embodiments of the decentralized system may reduce cost and improve data security.

Figure 2:
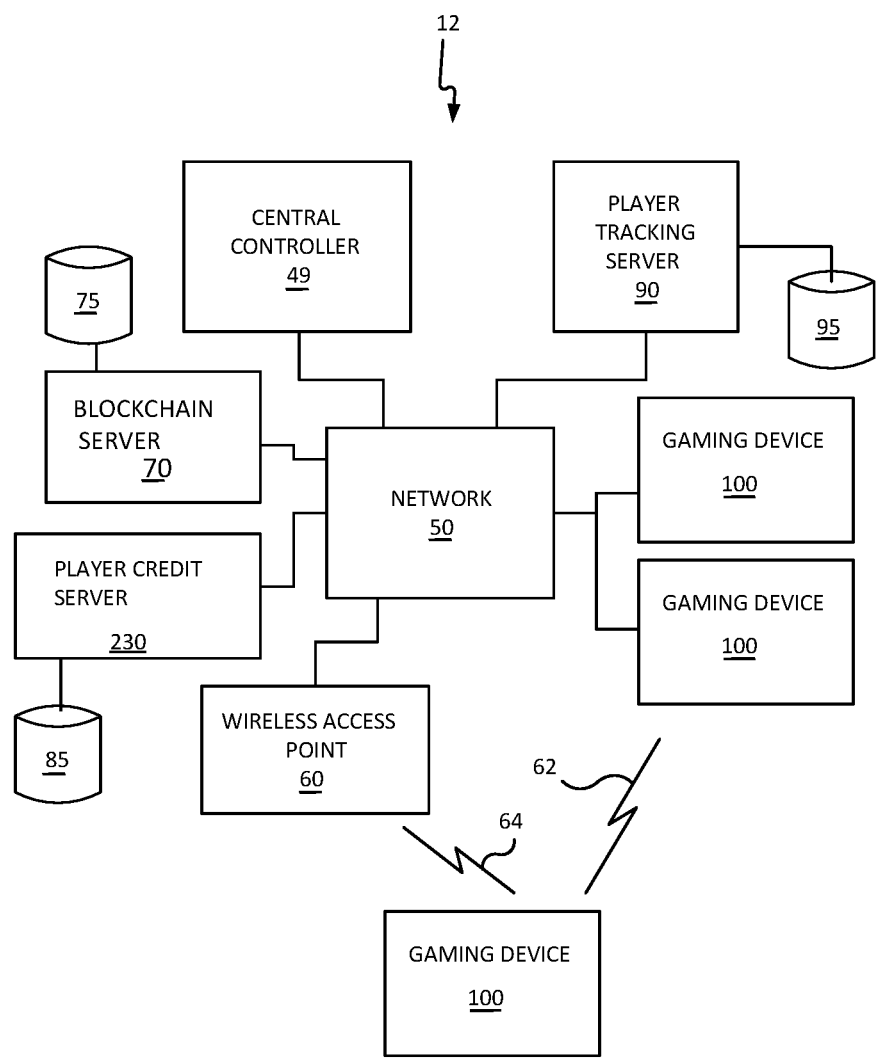
FIG. 2 illustrates a system according to some embodiments herein.

Reference is now made to FIG. 2, which illustrates a casino management system 12 including a plurality of gaming devices 100. The casino management system 12 may be located, for example, on the premises of a gaming establishment, such as a casino, in a private residence, or may include components that are located at different locations. The gaming devices 100 may be in communication with each other and/or a central controller 49 through a data communication network 50, or remote communication link. The data communication network 50 may be a private data communication network that is operated, for example, by the gaming facility that operates the gaming device 100, a publicly accessible data communication network such as the Internet, or a combination thereof. Communications over the data communication network 50 may be encrypted for security. The central controller 49 may be any suitable server or computing device which includes at least one processor circuit, such as a processor, and at least one memory or storage device. Each gaming device 100 may include a processor circuit that transmits and receives events, messages, commands or any other suitable data or signal between the gaming device 100 and the central controller 49 and/or other gaming devices 100. The gaming device processor is operable to execute such communicated events, messages or commands in conjunction with the operation of the gaming device 100. Moreover, the processor of the central controller 49 is configured to transmit and receive events, messages, commands or any other suitable data or signal between the central controller 49 and each of the individual gaming devices 100. In some embodiments, one or more of the functions of the central controller 49 may be performed by one or more gaming device processors. Moreover, in some embodiments, one or more of the functions of one or more gaming device processors as disclosed herein may be performed by the central controller 49.

A wireless access point 60 provides wireless access to the data communication network 50. The wireless access point 60 may be connected to the data communication network 50 as illustrated in FIG. 2, or may be connected directly to the central controller 49 or another server connected to the data communication network 50.

One or more servers, such as a player credit server 80, may also be connected through the data communication network 50. Similarly, the gaming content server 80 may manage delivery of the gaming content to the user of a gaming device 100. The gaming content may be stored in a gaming content database 85. A blockchain server 70 may manage access, update, storage, consensus determination, and/or excluded player identification corresponding to the player credit consortium blockchain 200. The blockchain data may be stored in a blockchain database 75. The blockchain server 70 and a player credit server 80 may be implemented within or separately from each other. The blockchain server 70 and a player credit server 80 may also be implemented within or separately from the central controller 49.

A player tracking server 90 may also be connected through the data communication network 50. The player tracking server 90 may manage a player tracking account that tracks the gameplay and spending and/or other player preferences and customizations of a player, i.e., the user of the gaming device 100, manages loyalty awards for the player, manages funds deposited or advanced on behalf of the player, and other functions. Player information managed by the player tracking server 90 may be stored in a player information database 95. In some embodiments, the player information database 95 and/or the player tracking server 90 may include and/or provide information that may be used by the blockchain server 70 to detect excluded players. For example, data corresponding to an excluded player may be received responsive to the excluded player submitting and/or inserting a player tracking card to a gaming table or machine.

The gaming devices 100 communicate with one or more elements of the system 12 to coordinate providing streaming video content and synchronized gaming content. For example, in some embodiments, a gaming device 100 may communicate directly with another gaming device 100 over a wireless interface 62, which may be a WiFi link, a Bluetooth link, an NFC link, etc. In other embodiments, the gaming device 100 may communicate with the data communication network 50 (and devices connected thereto, including EGMs) over a wireless interface 64 with the wireless access point 60. The wireless interface 64 may include a WiFi link, a Bluetooth link, an NFC link, etc. In still further embodiments, the gaming device 100 may communicate with other gaming devices 100 or other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

The wireless interfaces 62, 64 allow the gaming devices 100 and/or central controller 49 to coordinate providing player data from gaming devices 100.

Figure 3:
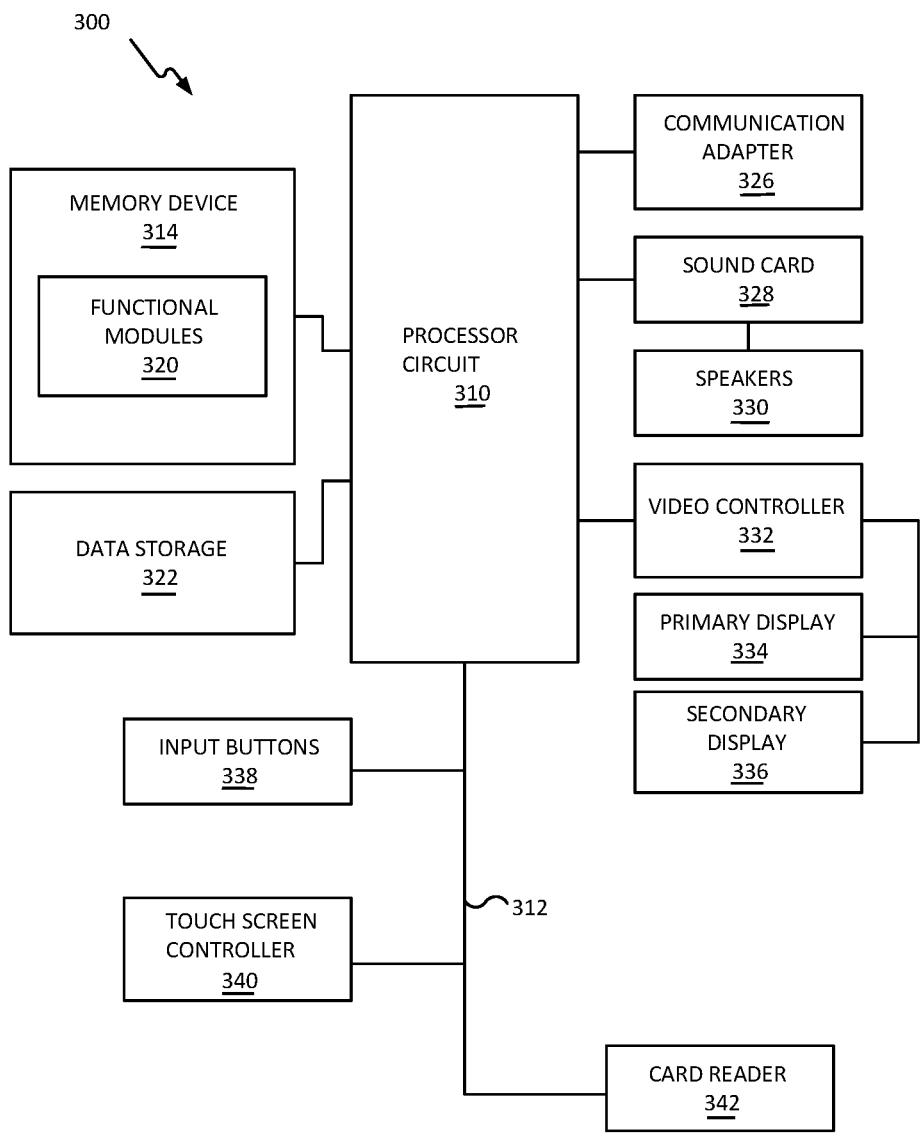
FIG. 3 is a block diagram that illustrates various components of a computing device that may embody or be included as part of the devices, systems, and/or components above, according to some embodiments.

Reference is now to FIG. 3, which is a block diagram that illustrates various components of a computing device 300, which may embody or be included as part of the devices, systems, and/or components above, according to some embodiments. As shown in FIG. 3, the computing device 300 may include a processor circuit 310 that controls operations of the computing device 300. Although illustrated as a single processor, multiple special purpose and/or general-purpose processors and/or processor cores may be provided in the computing device 300. For example, the computing device 300 may include one or more of a video processor, a signal processor, a sound processor and/or a communication controller that performs one or more control functions within the computing device 300. The processor circuit 310 may be variously referred to as a "controller," "microcontroller," "microprocessor" or simply a "computer." The processor circuit 310 may further include one or more application-specific integrated circuits (ASICs).

Various components of the computing device 300 are illustrated in FIG. 3 as being connected to the processor circuit 310. It will be appreciated that the components may be connected to the processor circuit 310 and/or each other through one or more buses 312 including a system bus, a communication bus and controller, such as a USB controller and USB bus, a network interface, or any other suitable type of connection.

The computing device 300 further includes a memory device 314 that stores one or more functional modules 320 for performing the operations described above. Alternatively, or in addition, some of the operations described above may be performed by other devices connected to the network, such as the network 50 of the peer-to-peer wagering system 12 of FIG. 2, for example. The computing device 300 may communicate with other devices connected to the network to facilitate performance of some of these operations. For example, the computing device 300 may communicate and coordinate with certain displays to identify elements of a race being displayed by a particular display.

The memory device 314 may store program code and instructions, executable by the processor circuit 310, to control the computing device 300. The memory device 314 may include random access memory (RAM), which can include non-volatile RAM (NVRAM), magnetic RAM (ARAM), ferroelectric RAM (FeRAM) and other forms as commonly understood in the gaming industry. In some embodiments, the memory device 314 may include read only memory (ROM). In some embodiments, the memory device 314 may include flash memory and/or EEPROM (electrically erasable programmable read only memory). Any other suitable magnetic, optical and/or semiconductor memory may operate in conjunction with the gaming device disclosed herein.

The computing device 300 may include a communication adapter 326 that enables the computing device 300 to communicate with remote devices, such as the wireless network, another computing device 300, and/or a wireless access point, over a wired and/or wireless communication network, such as a local area network (LAN), wide area network (WAN), cellular communication network, or other data communication network, e.g., the network 50 of FIG. 2.

The computing device 300 may include one or more internal or external communication ports that enable the processor circuit 310 to communicate with and to operate with internal or external peripheral devices, such as a sound card 328 and speakers 330, video controllers 332, a primary display 334, a secondary display 336, input buttons 338 or other devices such as switches, keyboards, pointer devices, and/or keypads, a touch screen controller 340, a card reader 342, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 310. Although illustrated as being integrated with the computing device 300, any of the components therein may be external to the computing device 300 and may be communicatively coupled thereto. Although not illustrated, the computing device 300 may further include a rechargeable and/or replaceable power device and/or power connection to a main power supply, such as a building power supply.

Figure 4:
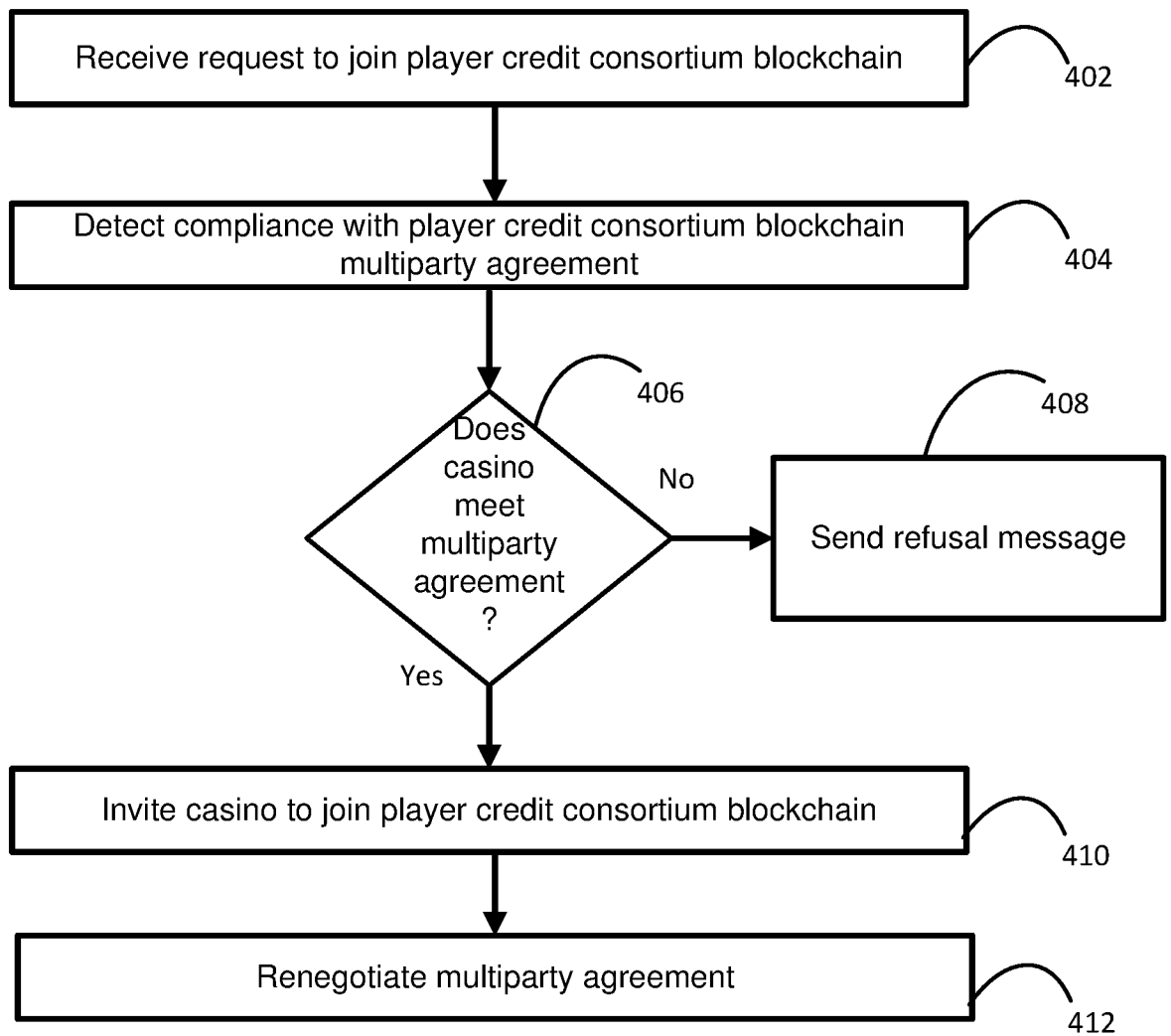
FIG. 4 is a schematic flow diagram illustrating operations for system permission of casinos and/or other gaming venue operators in the player credit consortium blockchain according to some embodiments.

Reference is now made to FIG. 4, which is a schematic flow diagram illustrating operations for system permission of casinos and/or other gaming venue operators in the player credit consortium blockchain according to some embodiments. Some embodiments include receiving a request to join the player credit consortium blockchain (block 402). Prior to receiving the request, a casino system management node may generate the player credit consortium blockchain. Some embodiments provide that the system is decentralized, the player credit consortium blockchain may be generated by a gaming operator node. Requests to join the player credit consortium blockchain may be evaluated by detecting compliance with the plyer credit consortium blockchain multi-party agreement (block 404). Detecting compliance may include coordinating organization changes between multiple parties and identifying mechanisms for adding data blocks in the blockchain based on the multiparty agreement. A determination is made as to whether the casino meets the requirements of multiparty agreement (block 406). The requirements may include definitions of processes, thresholds, protocols, access policies, security procedures, and/or equipment standards, among others. If the casino meets the terms of the multiparty agreement, then the casino may be invited to join the player credit consortium blockchain (block 410). In contrast, if the casino does not meet the terms of the multiparty agreement, then a refusal message may be sent (block 408).

As provided herein, the multiparty agreement may further identify which hierarchies, if any, a new data resource should be added to and the location within the hierarchy that the resource data resource should be added. In some embodiments, organization changes between multiple parties may be defined including mechanisms to approve a change to the organization. For example, the multiparty agreement may define an authenticated 2-way handshake mechanism to confirm or deny a potential change to an organization. Further mechanisms defined for multiparty agreements may include emailed invitations, single use tokens, and/or shared secrets (domains/passwords), among others.

In some embodiments, once a requesting casino is invited to join the player credit consortium blockchain, the multi-party agreement may be renegotiated and/or re-executed to include data corresponding to a new consortium blockchain member (block 412).

Figure 5:
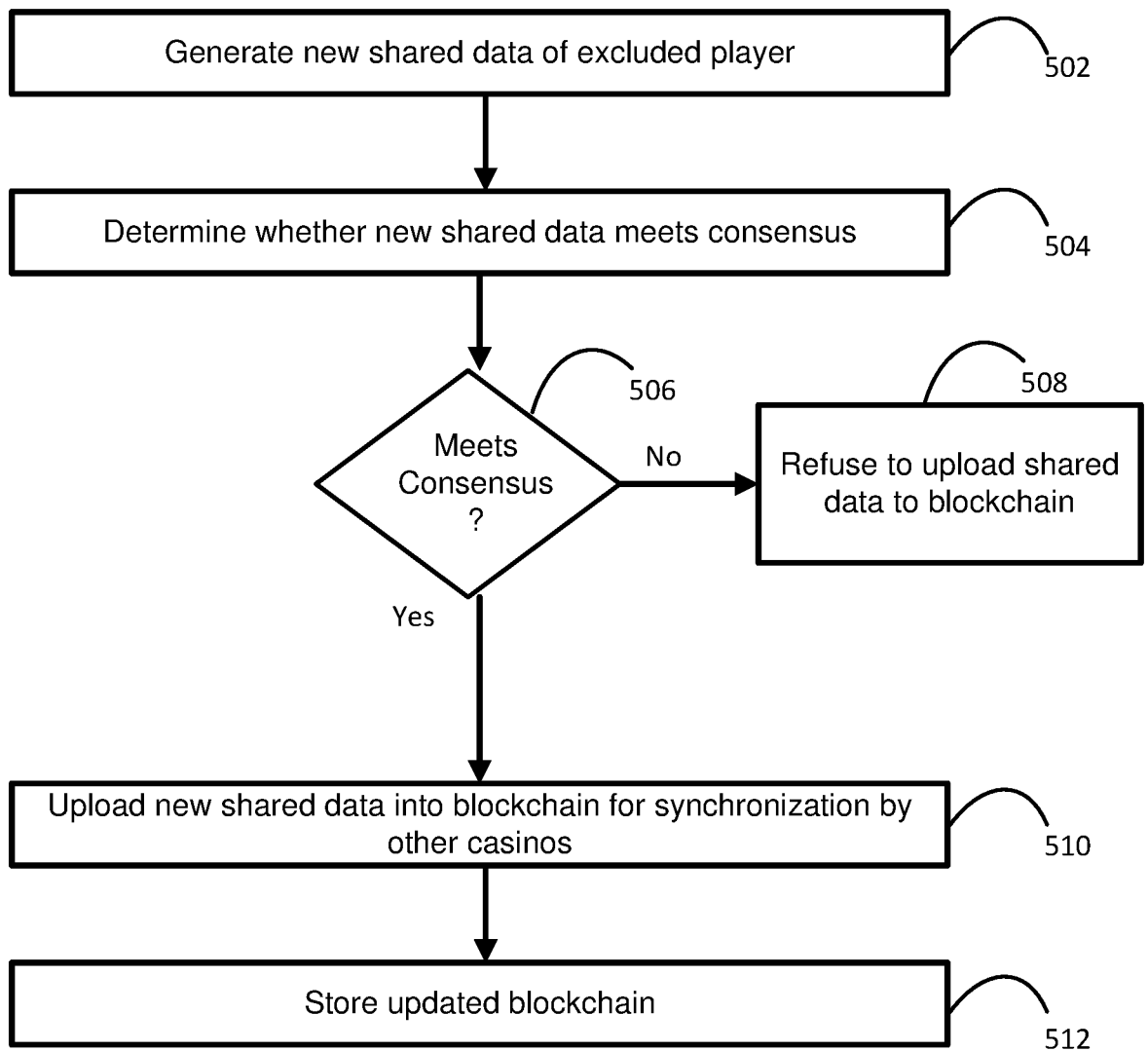
FIG. 5 is a schematic flow diagram illustrating operations of a system for creating and synchronizing shared player credit data according to some embodiments.

Reference is now made to FIG. 5, which is a schematic flow diagram illustrating operations of a system for creating and synchronizing shared player credit data according to some embodiments. Operations include generating new shared data corresponding to an excluded player (block 502). For example, a casino may be a player credit consortium blockchain member operating as node in a system for sharing player credit data with other casinos.

In such embodiments, it is determined whether the new shared data meets a consensus (block 504). In a blockchain configuration, there are varying consensus algorithms that can be used. For example, a private blockchain may choose an algorithm such as Practical Byzantine Fault Tolerance (PBFT). The PBFT mechanism may be useful for small networks, such as networks having fewer than about 100 nodes. Other examples include a Proof of Work (PoW) consensus algorithm and/or a Proof of Stake (PoS) consensus algorithm, which may be used as the value of an underlying data block and/or value changes.

If the new shared data of the excluded player does not meet the consensus (block 506), then the operations may include refusing to upload the shared data to the blockchain. Some embodiments provide that feedback data is sent to the player credit consortium blockchain member that submitted the new shared data. In some embodiments, the feedback data may identify a portion of the new shared data that was the basis for the new shared data not meeting the consensus mechanism. In some embodiments, the consensus may be based on the approval of a percentage of all of the player credit consortium blockchain members. For example, some embodiments provide that at least thirty percent of the player credit consortium blockchain members must evaluate the new shared data and determine that the new shared data meets the consensus mechanism. Some embodiments provide that more or less than thirty percent of the player credit consortium blockchain members must evaluate the new shared data and determine that the new shared data meets the consensus mechanism.

If the new shared player credit data does meet the consensus (block 506), then the new shared data is uploaded into the blockchain for synchronization by other casinos (block 510). Some embodiments provide that every time a change is made to the blockchain, the blockchain is synchronized by and/or sent to each player credit consortium blockchain member. Some embodiments provide that every time a change is made to the blockchain, the change is sent for the consortium blockchain members to synchronize their own instances of the blockchain. In either circumstance, the updated blockchain may be stored in a data repository that is local to the casino and/or player credit consortium blockchain member's venue (block 512). In this manner, the most updated version of the blockchain may be decentralized and locally available for use by player credit consortium blockchain members.

Figure 6:
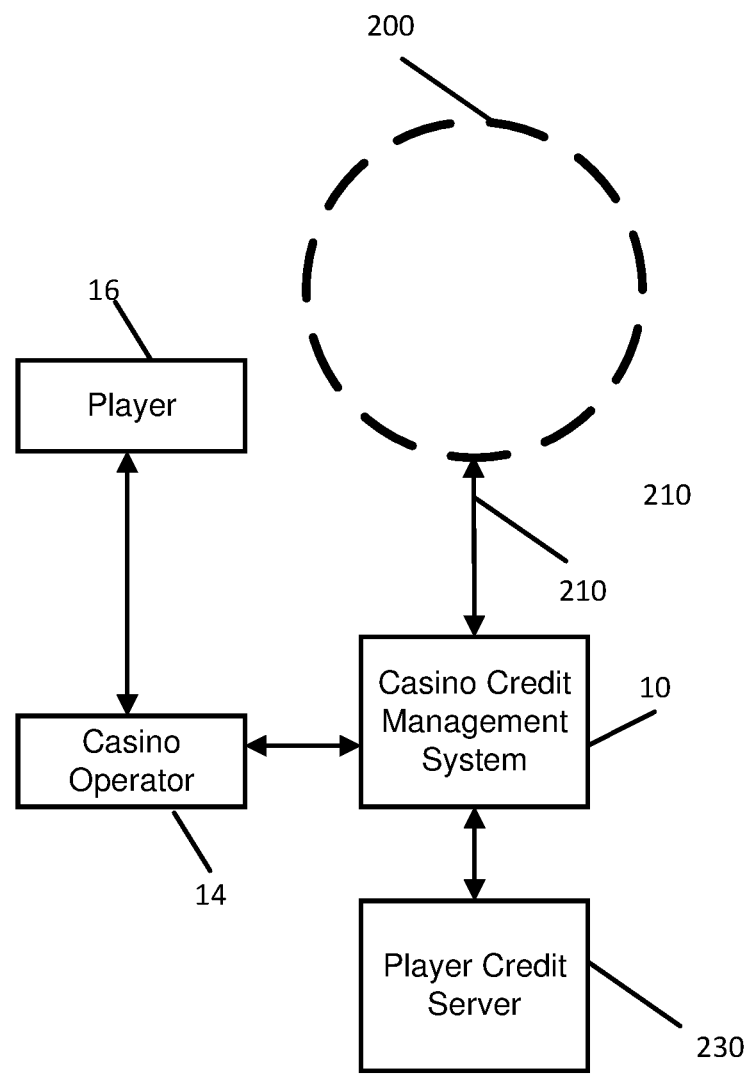
FIG. 6 is a flow chart of a player credit update according to some embodiments.

Brief reference is now made to FIG. 6, which is a flow chart of a player credit update according to some embodiments. The casino operator 14 receives credit account information corresponding to the credit that was extended to the player. In some embodiments, the credit account information may include a partial or complete repayment of the credit that was extended to the player 16. Responsive to the credit account repayment, the casino operator may update the player's credit data in the casino credit management system 10. The casino credit management system 10 may send the updated credit record to the blockchain 200 for syncing with the credit data that may be used by other casinos. In this manner, each casino may have the most updated credit data corresponding to that player 16.

Figure 7:
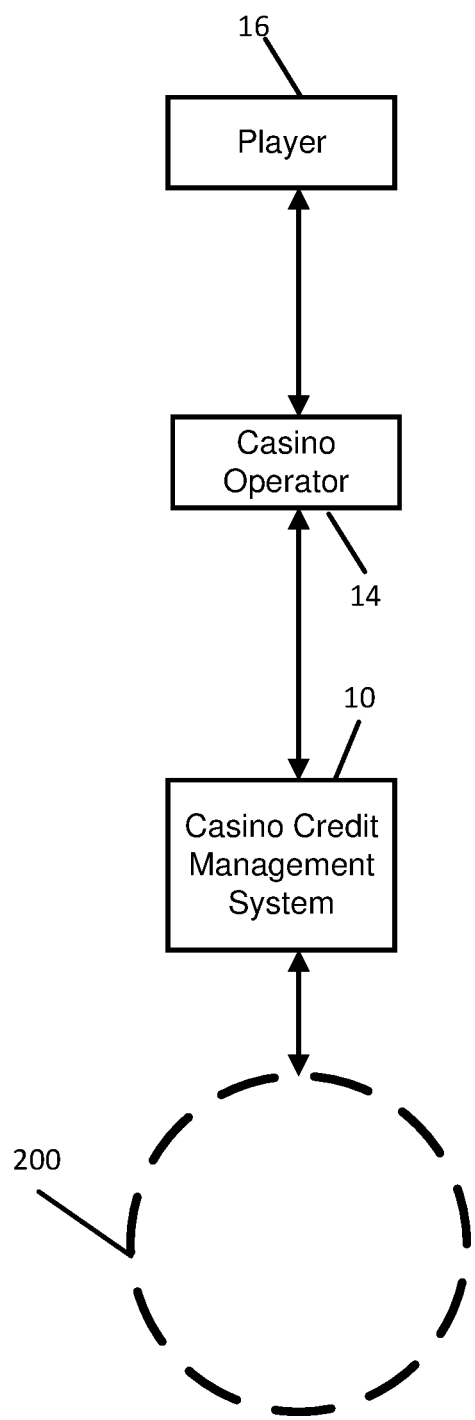
FIG. 7 is a flow chart of a player credit request according to some embodiments.

Reference is now made to FIG. 7, which is a flow chart of a player credit request according to some embodiments. The player 16 requests that the casino extend credit to the player for playing 16 in the casino. For example, the request for credit may be made through the casino operator 14. The casino operator 14 may request the credit data corresponding to the player 16 from the casino credit management system 10. The casino credit management system 10 requests the player credit data that includes the aggregate of player credit data from the player credit consortium blockchain 200.

The player credit consortium blockchain 200 sends the player's credit data to the casino credit management system 10. In some embodiments, the player credit data is sent to the casino operator 14 to determine whether or not to extend the requested credit to the player 16. Some embodiments provide the decision regarding the credit request is performed by the casino credit management system 10. If the requested credit is approved, then the credit is extended and the casino credit management system 10 updates the player credit consortium blockchain 200.

Figure 8:
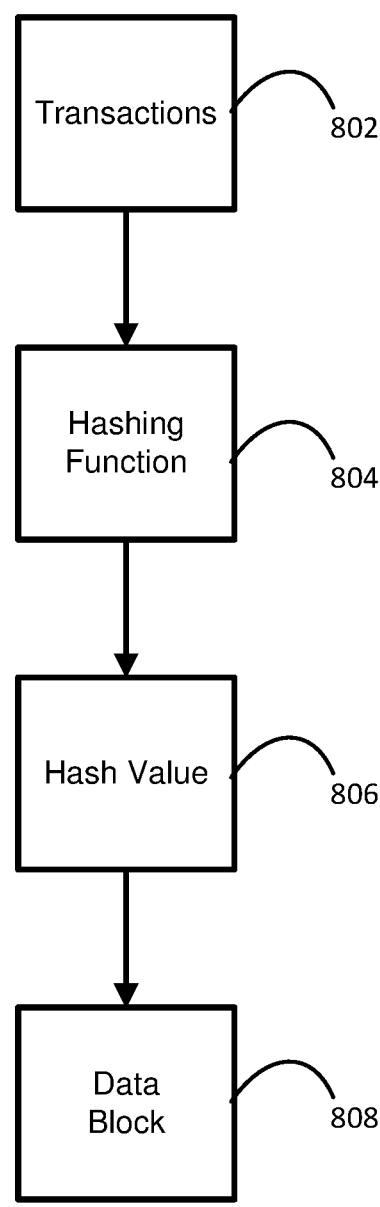
FIG. 8 is a schematic block diagram illustrating various operations for a blockchain transaction recordation according to some embodiments.

Reference is now made to FIG. 8, which is a schematic block diagram illustrating various operations for a blockchain transaction recordation according to some embodiments. As illustrated in FIG. 8, transactions 802 are occurring at various gaming casinos. In accordance with various embodiments, a hash may be created for each entry. For example, a cryptographic hash function may create a one-way, (essentially) collision free signature of the entry. The hash algorithm generates a hash. Using hashing function 804, hash values 806 are created of these transactions which are then added to data blocks 808 that are in the blockchain.

As a general principle, a validation process may be performed to ensure that the new data block meets the criteria for inclusion into the blockchain. In a blockchain configuration, there are varying consensus algorithms that can be used. For example, a private blockchain may choose an algorithm such as Practical Byzantine Fault Tolerance (PBFT). The PBFT mechanism may be useful for small networks, such as networks having fewer than about 100 nodes. Other examples include a Proof of Work (PoW) consensus algorithm and/or a Proof of Stake (PoS) consensus algorithm, which may be used as the value of an underlying data block and/or value changes.

Figure 9:
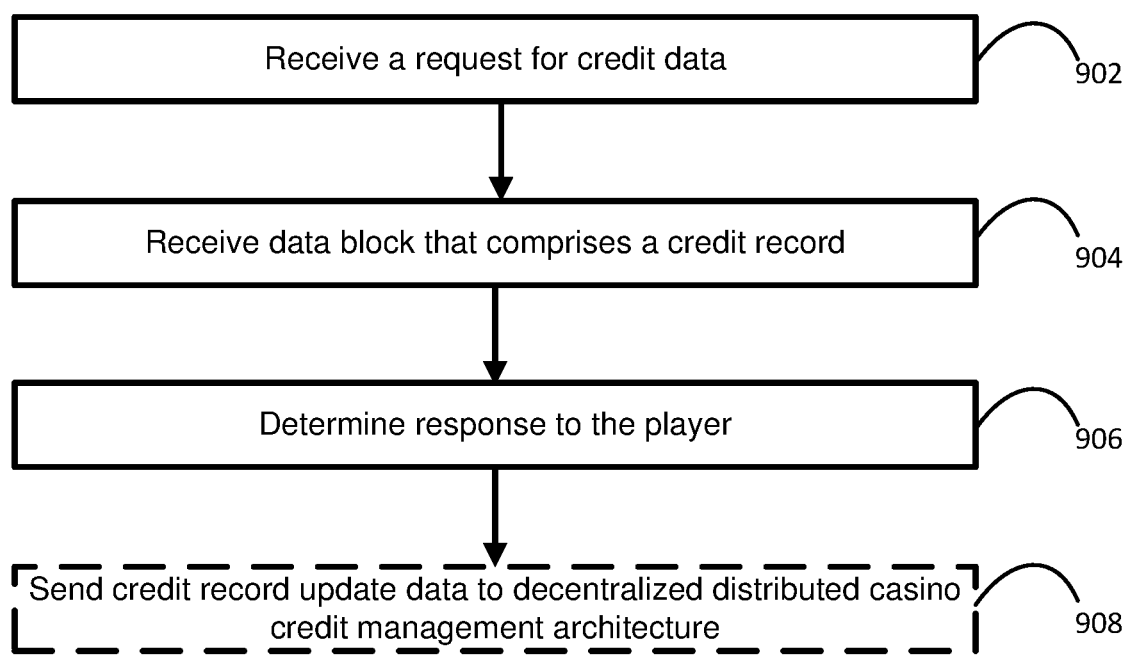
FIG. 9 is a schematic block diagram illustrating various operations for a blockchain transaction according to some embodiments.

Reference is now made to FIG. 9, which is a schematic block diagram illustrating various operations for a blockchain transaction according to some embodiments. In some embodiments, a system includes a communication interface, a processor circuit and a memory coupled to the embodiments. The memory includes machine readable instructions that, when executed by the processor circuit, cause the processor circuit to receive (block 902), from a casino operator, a request for credit data that corresponds to a player that requested credit from the casino operator. The requested credit may be designated for use in a wagering event in the casino. In response to receiving the request for credit data, the processor circuit further receives (block 904), from a decentralized distributed casino credit management architecture, a data block that includes a credit record that corresponds the player. The processor circuit may be further configured to determine (block 906), based on the credit record, a response to the player that requested the credit. The response may include extending the requested credit to the player or denying the requested credit.

In some embodiments, the processor circuit is further caused to send (block 908), to the decentralized distributed casino credit management architecture, credit record update data corresponding to the response to the player.

In some embodiments, the casino includes a party in a multiparty agreement corresponding to the decentralized distributed casino credit management architecture.

In some embodiments, the decentralized distributed casino credit management architecture includes a player credit consortium blockchain and the player credit consortium blockchain includes multiple data blocks corresponding to multiple players that have requested credit and that includes the data block.

In some embodiments, the data block further includes statistical data corresponding to the player that represents previous borrowing activity of the player. Some embodiments provide that a non-exhaustive list of data that may be included in the data block includes how much the player is or has deposited, borrowing history, return rate of borrowed funds, overdue debt, the duration of the planned and/or previous credit extensions, most recent borrowing data, maximum amount ever loaned, frequency of borrowing activity, unique identifier of the player, and/or an aggregate value of all of the funds ever borrowed by the player at casinos.

Some embodiments provide that the data block further includes player identification data that is encrypted to protect private information corresponding to the player. In some embodiments, the data block further includes historical data corresponding to previous requests for credit made by the player and responses to the previous requests for credit. Some embodiments provide that the player credit consortium blockchain receives player credit data from multiple player credit management systems that are associated with multiple casinos. In some embodiments, the player credit consortium blockchain provides the player credit data to the player credit management systems that are associated with the plurality of casinos and the data block further includes historical data corresponding to previous requests for credit made by the player at the multiple casinos.

Some embodiments provide that the player credit consortium blockchain includes instances in each of multiple nodes in the decentralized distributed casino credit management architecture. In some embodiments, the multiple nodes include the multiple casinos in the player credit consortium blockchain.

Some embodiments include receiving, from a non-participating casino, a request to join a player credit consortium blockchain. Responsive to receiving the request, operations include detecting compliance of the non-participating casino relative to a multi-party agreement that is associated with the player credit consortium blockchain. Some embodiments provide that, in response to detecting that the non-participating casino is not compliant with the multi-party agreement, a refusal message is caused to be sent to the non-participating party. In some embodiments, in response to detecting that the non-participating casino is compliant with the multi-party agreement, an invitation to the player credit consortium blockchain is caused to be sent to the non-participating casino. Some embodiments provide that the multi-party agreement with all of the casinos in the player credit consortium blockchain is renegotiated.

In some embodiments, the decentralized distributed casino credit management architecture includes a blockchain and the blockchain includes a decentralized distributed digital ledger of the credit data corresponding to the player.

In some embodiments, the processor circuit is further caused to receive indication that a payment of an amount that the player borrowed has been received and to send an update to the decentralized distributed casino credit management architecture that includes the indication that the player has paid the amount that was borrowed.

Some embodiments provide that the processor circuit is further caused to receive indication that a payment of an amount that the player borrowed has not been received and send an update to the decentralized distributed casino credit management architecture that includes the indication that the player has not paid the amount that was borrowed.

Figure 10:
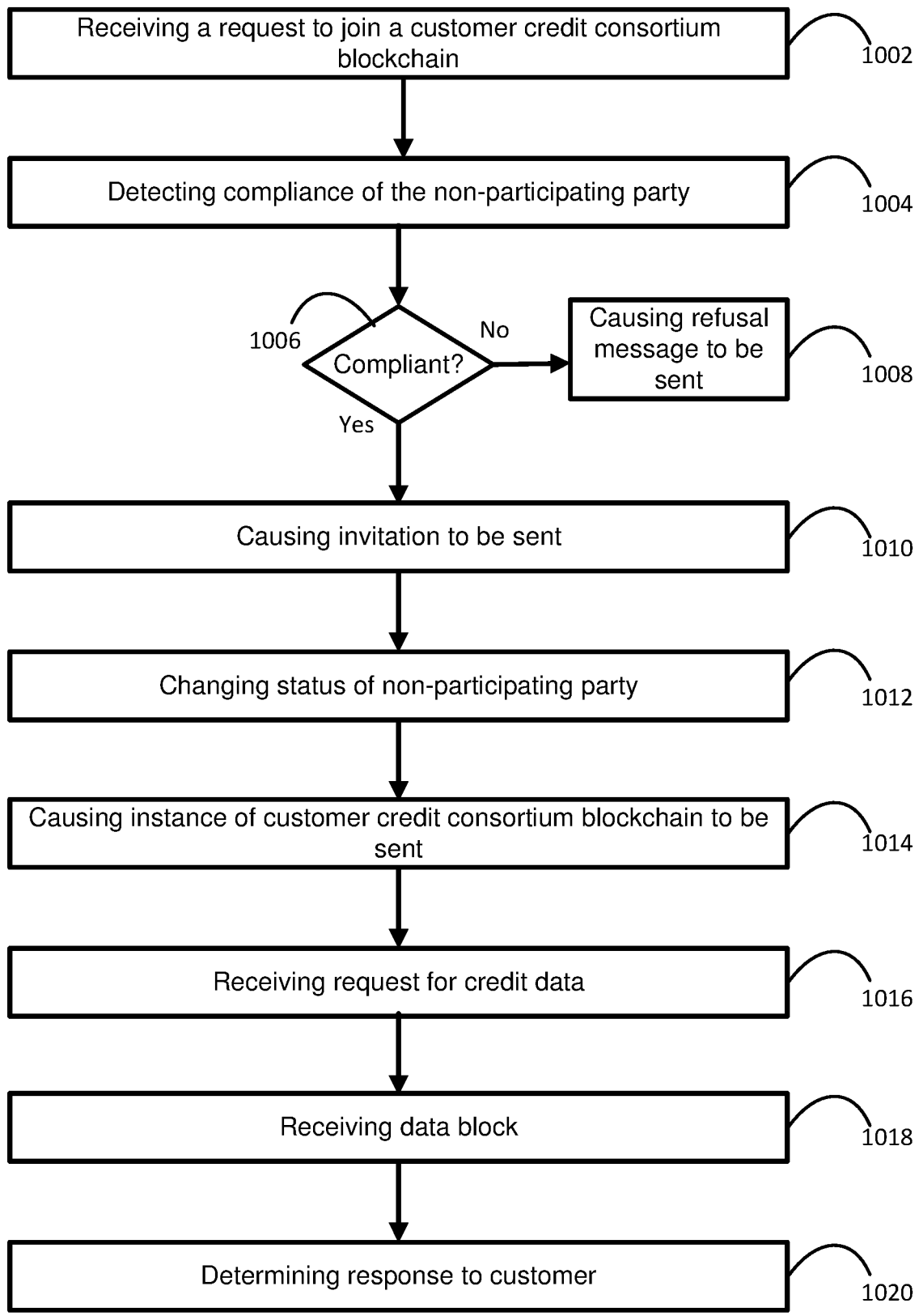
FIG. 10 is a schematic block diagram illustrating various operations for a blockchain transaction according to some embodiments.

Reference is now made to FIG. 10, which is a schematic block diagram illustrating various operations for a blockchain transaction according to some embodiments. Operations may include receiving (block 1002), from a non-participating party, a request to join a customer credit consortium blockchain that includes multiple member parties and detecting (block 1004) compliance of the non-participating party relative to a multi-party agreement that is associated with the customer credit consortium blockchain. Operations may include, in response to detecting (block 1006) that the non-participating party is not compliant with the multi-party agreement, causing (block 1008) a refusal message to be sent to the non-participating party indicating that the non-participating party is not permitted to join the customer credit consortium blockchain. In response to detecting (block 1006) that the non-participating party is compliant with the multi-party agreement, causing (block 1010) an invitation to the customer credit consortium blockchain to be sent to the non-participating party. Operations include changing (block 1012) a status of the non-participating party to a customer credit consortium blockchain party and causing (block 1014) an instance of the customer credit consortium blockchain to be sent to the customer credit consortium blockchain party.

Some embodiments include receiving (block 1016), by a party of the plurality of parties, a request for credit data that corresponds to a customer that requested credit, from the party. In response to receiving the request for credit data, the processor circuit further receives (block 1018), from a decentralized distributed credit management architecture, a data block that includes a credit record that corresponds the customer. Some embodiments include determining (block 1020), based on the credit record, a response to the customer that requested the credit. In some embodiments, the response includes extending the requested credit to the customer or denying the requested credit.

Some embodiments provide that the data block further includes statistical data corresponding to the customer that represents previous borrowing activity of the customer. In some embodiments, the data block includes customer identification data that is encrypted to protect private information corresponding to the customer. Some embodiments include sending, to the decentralized distributed credit management architecture, credit record update data corresponding to the response to the customer.

Figure 11:
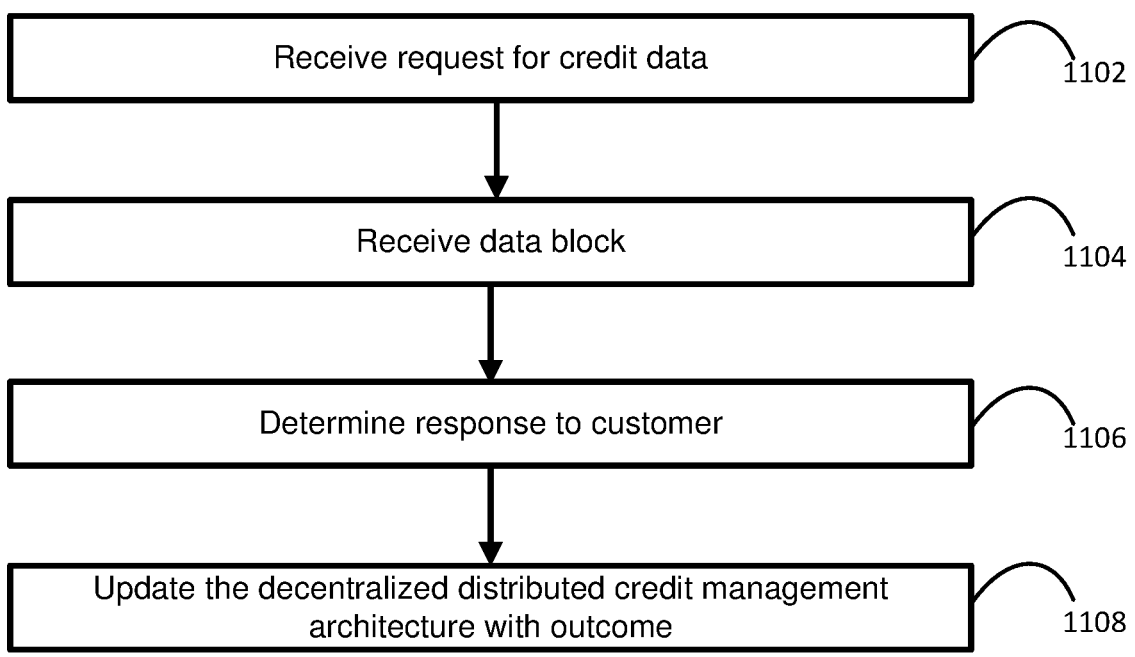
FIG. 11 is a schematic block diagram illustrating various operations for a blockchain transaction according to some embodiments.

Reference is now made to FIG. 11, which is a schematic block diagram illustrating various operations for a blockchain transaction according to some embodiments. In some embodiments, a request for credit data is received. Operations include receiving (block 1102), by a party of multiple parties, a request for credit data that corresponds to a customer that requested credit from the party. In response to receiving the request for credit data, operations further receive (block 1104), from a decentralized distributed credit management architecture, a data block that comprises a credit record that corresponds the customer. Operations include determining (block 1106), based on the credit record, a response to the customer that requested the credit and update (block 1108) the decentralized distributed credit management architecture with an outcome of determining the response to the customer.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

In some embodiments, a device, apparatus, system and/or computer program product may be described as causing a result and/or action. In such embodiments, causing may include actually performing the action and/or result and/or as performing any action that causes another device, apparatus, system and/or computer program product to cause the result or action.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A method comprising:
    receiving via a communication device and from a non-participating party, a request to join a customer credit consortium blockchain that comprises a plurality of member parties;
    detecting compliance of the non-participating party relative to a multi-party agreement that is associated with the customer credit consortium blockchain;
    in response to detecting that the non-participating party is not compliant with the multi-party agreement, generating a refusal message to be sent to the non-participating party indicating that the non-participating party is not permitted to join the customer credit consortium blockchain;
    in response to detecting that the non-participating party is compliant with the multi-party agreement, sending an invitation to the customer credit consortium blockchain to be sent to the non-participating party;
    changing a status of the non-participating party to a customer credit consortium blockchain party;
    sending an instance of the customer credit consortium blockchain to be sent to the customer credit consortium blockchain party; and
    providing a response to the non-participating party,
    wherein a decentralized distributed casino credit management architecture comprises the customer credit consortium blockchain,
    wherein the customer credit consortium blockchain comprises a plurality of data blocks corresponding to a plurality of players that have requested credit and that comprises a data block of the plurality of data blocks, wherein every time a change is made to the customer credit consortium blockchain, the blockchain is automatically synchronized by each player credit consortium member, and wherein an updated blockchain is automatically stored in a data repository, further receiving, from a decentralized distributed credit management architecture, a data block that comprises a credit record that corresponds to a customer, wherein the decentralized distributed credit management architecture comprises a player credit consortium blockchain, wherein the player credit consortium blockchain uses a Practical Byzantine Fault Tolerance (PBFT) mechanism.

2. The method of claim 1, further comprising:

receiving, by a party of the plurality of member parties, a request for credit data that corresponds to a customer that requested credit, from the party;

in response to receiving the request for credit data, determining, based on the credit record, a response to the customer that requested the credit, wherein the response comprises extending the requested credit to the customer or denying the requested credit.

3. The method of claim 2, wherein the data block further comprises statistical data corresponding to the customer that represents previous borrowing activity of the customer.

4. The method of claim 2, wherein the data block further comprises customer identification data that is encrypted to protect private information corresponding to the customer.

5. The method of claim 2, further comprising sending, to the decentralized distributed credit management architecture, credit record update data corresponding to the response to the customer.

6. The method of claim 2, wherein the decentralized distributed credit management architecture comprises the player credit consortium blockchain.

7. The method of claim 6, wherein the player credit consortium blockchain comprises a plurality of data blocks corresponding to the plurality of players that have requested credit and that comprises the data block.

8. The method of claim 6, wherein blockchain operations comprise creating a hash value for an entry into the player credit consortium blockchain using a hashing function.

9. The method of claim 6, wherein the player credit consortium blockchain uses a Proof of Work (POW) consensus algorithm.

10. The method of claim 6, wherein the player credit consortium blockchain uses a Proof of Stake (POS) consensus algorithm based at least on how many nodes are in the player credit consortium blockchain.

11. The method of claim 1, wherein the customer credit consortium blockchain party comprises a casino.

12. A method comprising:

receiving via a communication device and from a non-participating party, a request to join a customer credit consortium blockchain that comprises a plurality of member parties;

detecting compliance of the non-participating party relative to a multi-party agreement that is associated with the customer credit consortium blockchain;

in response to detecting that the non-participating party is not compliant with the multi-party agreement, generating a refusal message to be sent to the non-participating party indicating that the non-participating party is not permitted to join the customer credit consortium blockchain;

in response to detecting that the non-participating party is compliant with the multi-party agreement, sending an invitation to the customer credit consortium blockchain to be sent to the non-participating party;

changing a status of the non-participating party to the customer credit consortium blockchain party;

sending an instance of the customer credit consortium blockchain to be sent to the customer credit consortium blockchain party; and providing a response to the non-participating player, wherein a decentralized distributed casino credit management architecture comprises the customer credit consortium blockchain, wherein the customer credit consortium blockchain comprises a plurality of data blocks corresponding to a plurality of players that have requested credit and that comprises a data block of the plurality of data blocks, wherein every time a change is made to the customer credit consortium blockchain, the customer credit consortium blockchain is automatically synchronized by each player credit consortium member, and wherein an updated blockchain is automatically stored in a data repository, further receiving, from a decentralized distributed credit management architecture, a data block that comprises a credit record that corresponds to a customer, wherein the decentralized distributed credit management architecture comprises a player credit consortium blockchain, wherein the player credit consortium blockchain uses a Proof of Work (POW) consensus algorithm.

13. A method comprising:

receiving via a communication device and from a non-participating party, a request to join a customer credit consortium blockchain that comprises a plurality of member parties;

detecting compliance of the non-participating party relative to a multi-party agreement that is associated with the customer credit consortium blockchain;

in response to detecting that the non-participating party is not compliant with the multi-party agreement, generating a refusal message to be sent to the non-participating party indicating that the non-participating party is not permitted to join the customer credit consortium blockchain;

in response to detecting that the non-participating party is compliant with the multi-party agreement, sending an invitation to the customer credit consortium blockchain to be sent to the non-participating party;

changing a status of the non-participating party to a customer credit consortium blockchain party;

sending an instance of the customer credit consortium blockchain to be sent to the customer credit consortium blockchain party; and providing a response to the non-participating player, wherein a decentralized distributed casino credit management architecture comprises the customer credit consortium blockchain, wherein the customer credit consortium blockchain comprises a plurality of data blocks corresponding to a plurality of players that have requested credit and that comprises a data block of the plurality of data blocks, wherein every time a change is made to the customer credit consortium blockchain, the customer credit consortium blockchain is automatically synchronized by each player credit consortium member, and wherein an updated blockchain is automatically stored in a data repository, further receiving, from a decentralized distributed credit management architecture, a data block that comprises a credit record that corresponds a customer, wherein the decentralized distributed credit management architecture comprises a player credit consortium blockchain, wherein the player credit consortium blockchain uses a Proof of Stake (POS) consensus algorithm based at least on how many nodes are in the player credit consortium blockchain.

* * * * *